(12) United States Patent
Van Zeijl et al.

(10) Patent No.: US 8,514,125 B2
(45) Date of Patent: Aug. 20, 2013

(54) DISTANCE MEASUREMENT

(75) Inventors: Paulus Thomas Maria Van Zeijl, Eindhoven (NL); Paul Mattheijssen, Eindhoven (NL); Octavio Alejandro Santana, Eindhoven (NL); Hugo Veenstra, Eindhoven (NL); Neil Christopher Bird, Bottisham (GB)

(73) Assignee: Koninklijke Philips N.V., Eindhoven (NL)

( * ) Notice: Subject to any disclaimer, the term of this patent is extended or adjusted under 35 U.S.C. 154(b) by 277 days.

(21) Appl. No.: 13/054,524

(22) PCT Filed: Jul. 15, 2009

(86) PCT No.: PCT/IB2009/053069
§ 371 (c)(1),
(2), (4) Date: Jan. 17, 2011

(87) PCT Pub. No.: WO2010/010486
PCT Pub. Date: Jan. 28, 2010

(65) Prior Publication Data
US 2011/0122012 A1      May 26, 2011

(30) Foreign Application Priority Data
Jul. 24, 2008   (EP) .................................... 08161039

(51) Int. Cl.
*G01S 13/00*      (2006.01)
(52) U.S. Cl.
USPC ............................................ 342/52; 342/118
(58) Field of Classification Search
USPC .................................................... 342/52, 118
See application file for complete search history.

(56) References Cited

U.S. PATENT DOCUMENTS

| | | | |
|---|---|---|---|
| 5,623,145 | A | 4/1997 | Nuss |
| 7,073,129 | B1 | 7/2006 | Robarts et al. |
| 7,105,820 | B2 | 9/2006 | Federici et al. |
| 7,363,157 | B1 | 4/2008 | Hanna et al. |

(Continued)

FOREIGN PATENT DOCUMENTS

| DE | 102005034087 A1 | 1/2007 |
|---|---|---|
| EP | 1770411 A2 | 4/2007 |

(Continued)

OTHER PUBLICATIONS

N. Yonemote et al: "Performance of Obstacle Detection and Collision Warning System for Civil Helicopters", Proceedings of SPIE., 626, 622208, 2006.
Alex Foessel-Bunting: "Radar Sensor Model for Three-Dimensional Map Building", The Robotics Institute, Camegie Mellon Univ., Pittsburgh, PA, 2000.
"3D Volumetric Radar Using 94GHZ Milimieter Waves", Enhanced and Synthetic Vision 2006, (OR20), SPIE Electronic Imaging Apr. 17-21, 2006, Orlando, FL.
Ferguson B, "THz Imaging", Chapter 3, SC-1, 2004.
Digital Video Broadcasting (DVB); IP Datacast Over DVB-H: Notification Framework, ETSI TS I02 832 V1.1.1; Technical Specification, Nov. 2008, 51 Page Document.

*Primary Examiner* — Timothy A Brainard

(57) ABSTRACT

A distance measurement arrangement provides a distance indication based on a delay between an electromagnetic signal, transmitted in a transmission mode, and a reflection of the electromagnetic signal, received in a reception mode. The distance measurement arrangement includes an antenna module having a plurality of antennas for transmitting the electromagnetic signal and for receiving the reflection. A beam-forming module defines respective magnitude and phase relationships with respect to respective antennas so as to cause the antenna module to provide a directional antenna pattern in at least one the two modes. A beam-forming and steering control module controls the respective magnitude and phase relationships as a function of a direction command. A 3-D picture can be formed by applying respective direction commands so as to obtain respective distance indications for respective portion in a two-dimensional picture.

11 Claims, 6 Drawing Sheets

(56) References Cited

U.S. PATENT DOCUMENTS

| | | |
|---|---|---|
| 2003/0043071 A1 | 3/2003 | Lilly et al. |
| 2004/0155192 A1 | 8/2004 | Tran et al. |
| 2005/0101306 A1 | 5/2005 | Zabawskyj et al. |
| 2006/0220946 A1* | 10/2006 | Nohmi .......................... 342/107 |
| 2007/0247612 A1 | 10/2007 | Pack et al. |
| 2008/0150832 A1 | 6/2008 | Ingram et al. |
| 2008/0291083 A1* | 11/2008 | Chang .......................... 342/354 |
| 2009/0040099 A1 | 2/2009 | Young et al. |
| 2009/0251362 A1* | 10/2009 | Margomenos et al. ....... 342/175 |
| 2009/0284405 A1* | 11/2009 | Salmon et al. .................. 342/22 |

FOREIGN PATENT DOCUMENTS

| | | |
|---|---|---|
| WO | 2005062943 A2 | 7/2005 |
| WO | WO 2007054685 A2 * | 5/2007 |
| WO | 2007132397 A2 | 11/2007 |
| WO | 2009063371 A1 | 5/2009 |

* cited by examiner

DISTANCE MEASUREMENT

FIELD OF THE INVENTION

An aspect of the invention relates to a distance measurement arrangement. The distance measurement arrangement may be used, for example, to generate a so-called depth map in association with a two-dimensional picture. Accordingly, a three-dimensional (3-D) representation of a scene can be formed, which is, briefly stated, a 3-D picture. Other aspects of the invention relate to a method of distance measurement, a 3-D picture capturing system, a method of 3-D picture capturing, and a computer program product for causing a programmable processor to carry at least one of the above methods.

BACKGROUND OF THE INVENTION

A distance indication can be obtained in the following manner. In a transmission step, an electromagnetic signal is transmitted towards an object whose distance needs to be determined. In a reception step, a reflection of the electromagnetic signal, which is caused by the object, is received with a given delay. The distance indication can be provided on the basis of this delay.

This principle, which is used in radar equipment, typically involves one or more antennas that have a given orientation and a given directional antenna pattern. The electromagnetic signal is transmitted in the form of the beam that has a particular direction. The orientation of the antenna and its directional antenna pattern determine the direction of the beam, which should point to the object whose distance needs to be determined.

The article entitled "Performance of obstacle detection and collision warning system for civil helicopters" by N. Yonemoto et al. published in the Proceedings of SPIE 6226, 622608 (2006), describes an obstacle detection and collision warning system for civil helicopters in which a color camera, an infrared camera and a Millimeter Wave (MMW) radar are employed as sensors. The MMW radar provides distance information. A personal computer (PC) is used as a data processor, which gathers color images, infrared images, and radar data to provide enhanced obstacle images on a display. Another PC controls the MMW radar and its scanning equipment, which comprises a gimbal ring. The sensors are mounted on the gimbal ring to manipulate the direction of the axis of the sensor or to eliminate helicopter vibration.

SUMMARY OF THE INVENTION

There is a need for a directional distance measurement arrangement that is relatively inexpensive, in particular for consumer applications.

In accordance with an aspect of the invention, a distance measurement arrangement provides a distance indication on the basis of a delay between an electromagnetic signal, which is transmitted in a transmission mode, and a reflection of the electromagnetic signal, which is received in a reception mode. The distance measurement arrangement includes an antenna module comprising a plurality of antennas for transmitting the electromagnetic signal and for receiving the reflection thereof. A beamforming module defines respective magnitude and phase relationships with respect to respective antennas so as to cause the antenna module to provide a directional antenna pattern in at least one of the two aforementioned modes.

Such a distance measurement arrangement does not require any electromechanical module for controlling the direction in which the distance measurement is carried out. For example, a gimbal ring as mentioned in the aforementioned article is not required. The direction in which the distance measurement is carried out can be controlled in an entirely electrical fashion. Such an electrical direction control will generally be less expensive than an electromechanical direction control. Moreover, an electrical direction control will generally be faster than an electromechanical direction control, which has a given inertia. This allows various distance measurements to be carried out in various different directions within a relatively short time interval. A depth scan can be carried out relatively fast.

According to another aspect of the invention, a 3-D picture is formed by means of a distance measurement arrangement as defined hereinbefore, which is capable of providing respective distance indications for respective objects in a two-dimensional picture. The respective distance indications may constitute a so-called depth map, which is associated with the two-dimensional picture. The depth map may comprise respective depth indications for respective portions of the two-dimensional picture. In order to generate such a depth map, respective direction commands that control the aforementioned respective magnitude and phase relationships, may be applied to the distance measurement arrangement. Accordingly, the distance measurement arrangement can carry out a depth scan that coincides with the two-dimensional picture. The depth map can be obtained in a relatively simple fashion, in particular if respective direction commands define respective directions that correspond with respective portions in the two-dimensional picture.

An implementation of the invention advantageously comprises one or more of the following additional features, which are described in separate paragraphs that correspond with individual dependent claims.

Preferably, the antenna module comprises a substrate on which the plurality of antennas is provided.

The substrate preferably comprises printed circuit board material.

The aforementioned respective magnitude and phase relationships are preferably controlled as a function of a direction command.

The beamforming module preferably comprises a gain/phase adjustment circuit, which comprises a pair of transmission lines of different length, a pair of gain-controllable circuits, and a signal combiner. The pair of transmission lines provides a first delayed signal and a second delayed signal in response to an input signal. The pair of gain-controllable circuits provides a first gain-adjusted delayed signal and a second gain-adjusted delayed signal in response to first delayed signals and the second delayed signal, respectively. The signal combiner combines the first gain-adjusted delayed signal and the second gain-adjusted delayed signal. The beam forming and steering control circuit preferably controls the ratio between the respective gains that the respective gain-controllable circuits provide.

A distance detection module preferably generates a carrier wave, which forms part of the electromagnetic signal that is transmitted, in a wavelength range comprised between 1 cm and 1 mm.

A detailed description, with reference to drawings, illustrates the invention summarized hereinbefore as well as the additional features. Wherein, where possible, the same reference numerals are used to denote similar parts or functions throughout the Figures.

DETAILED DESCRIPTION

Figure 1:
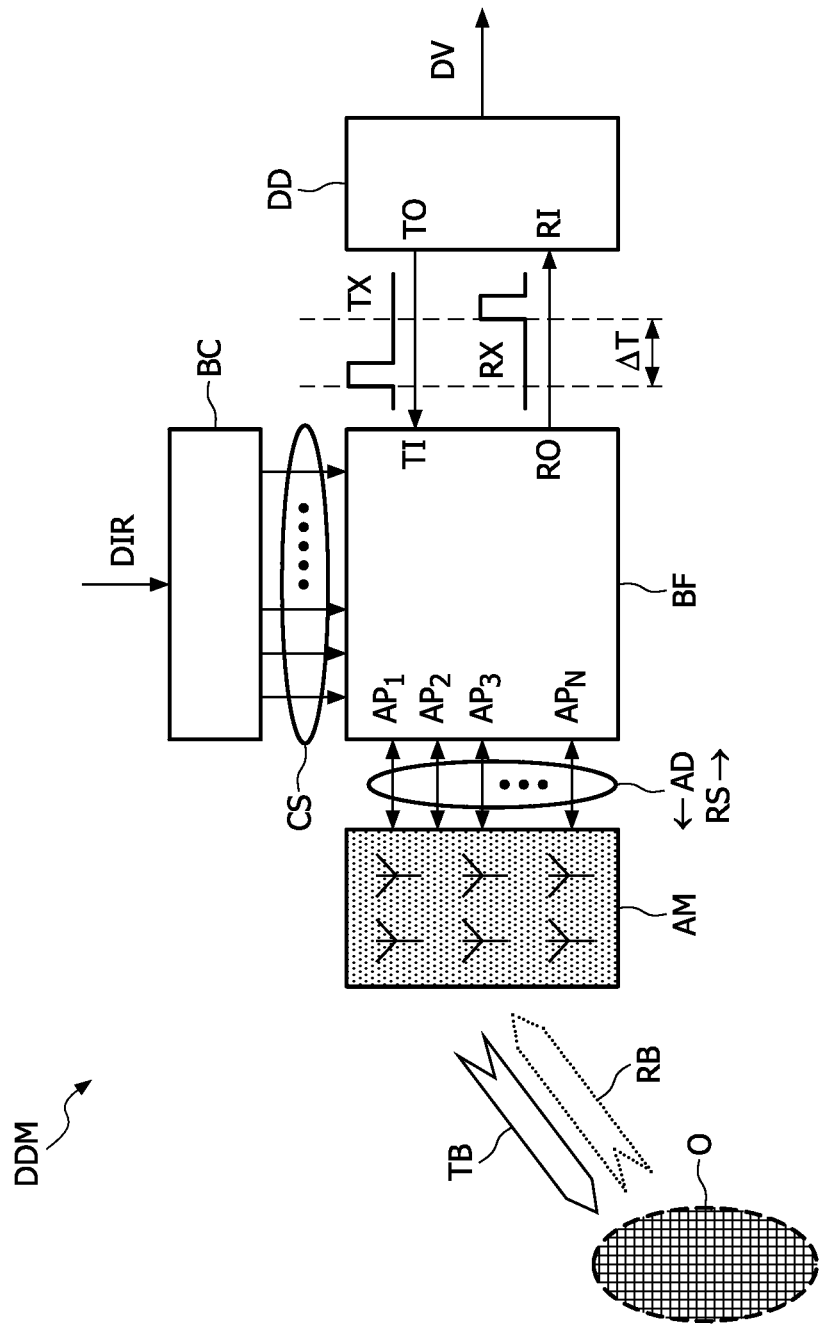
FIG. 1 is a block diagram that illustrates a directional distance measurement arrangement.

FIG. 1 illustrates a directional distance measurement arrangement DDM. The directional distance measurement arrangement DDM comprises an antenna module AM, a beam-forming module BF, a distance determination module DD, and a beam-forming and steering controller BC. The antenna module AM comprises a plurality of antennas, which may be present on, for example, a substrate.

The beam-forming module BF comprises a plurality of antenna ports $AP_1$, $AP_2$, $AP_3$, ... $AP_N$. Respective antenna ports are coupled to respective antennas comprised in the antenna module AM. The beam-forming module BF further comprises a transmission input TI and a reception output RO, which may physically constitute a single port or two separate ports.

The distance determination module DD comprises a transmission output TO and a reception input RI, which are coupled to the transmission input TI and the reception output RO, respectively, of the beam-forming module BF. Similarly, the transmission output TO and the reception input RI may physically constitute a single port or two separate ports. It should be noted that a single port does not necessarily imply a time-multiplex operation, as will be explained hereinafter.

The beam-forming and steering controller BC may be implemented by means of, for example, an instruction execution device and a program memory into which a set of instructions has been loaded that define operations carried out by the beam-forming and steering controller BC, which will be described hereinafter.

The directional distance measurement arrangement DDM basically operates as follows. The distance determination module DD produces a transmission pulse TX, which occurs at its transmission output TO at a given instant. The transmission pulse TX preferably comprises a carrier wave in a wavelength range comprised between 1 cm and 1 mm. For example, the carrier wave may have a fundamental frequency of 90 GHz. The beam-forming module BF receives the transmission pulse TX at its transmission input TI and produces a plurality of antenna driving signals in response thereto. Respective antennas in the antenna module AM receive respective antenna driving signals AD. The respective antenna driving signals AD have a particular magnitude and phase relationship with respect to each other. This causes the antenna module AM to produce a transmission beam TB in a particular direction.

The transmission beam TB may hit, as it were, an object O that is present in the direction concerned, as illustrated in FIG. 1. This will cause a reflection beam RB from the object O to the antenna module AM. The reflection beam RB causes respective antennas in the antenna module AM to produce respective reception signals RS. These respective reception signals RS occur at respective antenna ports $AP_1$, $AP_2$, $AP_3$, ..., $AP_N$ of the beam-forming module BF. The beam-forming module BF produces a reception pulse RX at its reception output RO in response to the respective reception signals RS from the respective antennas in the antenna module AM. The distance determination module DD measures a delay between the transmission pulse TX and the reception pulse RX. The distance determination module DD effectively converts this measured delay into a distance value DV. The distance value DV represents the distance of the object O in the direction concerned with respect to the antenna module AM.

The direction of the transmission beam TB is determined as follows. The beam-forming and steering controller BC receives a direction command DIR, which represents a desired direction of the transmission beam TB. The direction command DIR may be in the form of, for example, a pair of values in a binary format, one value representing azimuth, the other value representing elevation. The beam-forming and steering controller BC generates a set of gain/phase control signals CS on the basis of the direction command DIR.

Respective gain/phase control signals CS apply to respective transmission signal paths that extend from the transmission input TI of the beam-forming module BF to the respective antenna ports $AP_1$, $AP_2$, $AP_3$, ..., $AP_N$ thereof. A gain/phase control signal, which applies to a particular transmission signal path, determines a response of this signal path in terms of magnitude-versus-frequency and phase-versus frequency. Accordingly, the set of gain/phase control signals CS determine the magnitude and phase relationship that the respective antenna driving signals AD have with respect to each other. As mentioned hereinbefore, this magnitude and phase relationship determines the direction of the transmission beam TB.

The respective gain/phase control signals CS may equally apply to respective reception signal paths that extend from the respective antenna ports $AP_1$, $AP_2$, $AP_3$, ..., $AP_N$ of the beam-forming module BF to its reception output RO. The respective reception signal paths may correspond with the respective transmission signal paths mentioned hereinbefore, in the sense a reception signal path has a response that is similar to the response of the corresponding transmission signal path. In that case, the antenna module AM provides similar antenna patterns in transmission mode and in reception mode. Accordingly, the antenna module AM provides maximum reception sensitivity in the direction in which the transmission beam TB has been transmitted. This, however, is not necessary. The beam-forming and steering controller BC may cause the antenna module AM to provide different antenna patterns in transmission mode and in reception mode, respectively. For example, the antenna module AM may provide a directional pattern in transmission mode or in reception mode, and an omnidirectional antenna pattern in reception mode or in reception mode, respectively.

Figure 2:
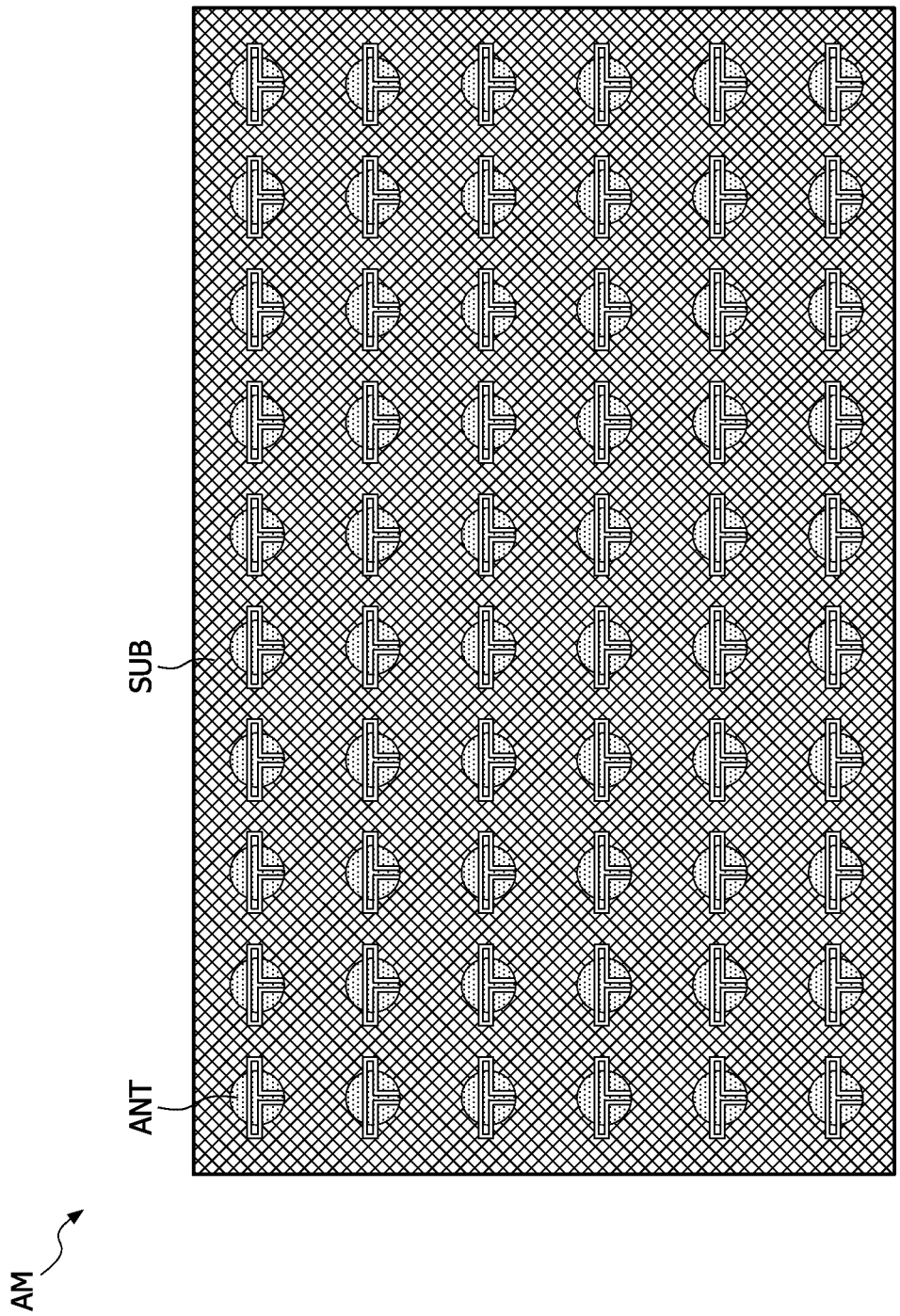
FIG. 2 is a pictorial diagram that illustrates an antenna module, which may form part of the directional distance measurement arrangement.

FIG. 2 illustrates the antenna module AM, or rather, an implementation thereof. The antenna module AM comprises a substrate SUB provided with a plurality of antennas ANT. The substrate SUB may comprise, for example, standard printed circuit board material, such as FR4 epoxy. The substrate SUB may also comprise special printed circuit board materials, such as, those known under the names Duroid, Rogers, LTCC, which are registered trademarks. The antennas may be formed, for example, by means of etching in a fashion similar to a manufacture of a printed circuit on which electrical components may be mounted.

The antenna module AM illustrated in FIG. 2 comprises 60 antennas, which are organized as an array. The antennas may be equidistantly spaced, and aligned on a grid with a grid distance that is a few times the wavelength of the carrier wave. For example, the grid distance may be 2.25 times the wavelength. In case the fundamental frequency of the carrier wave is 90 GHz as mentioned hereinbefore, the grid distance may be 7.5 mm. The antenna module AM may therefore be relatively small, having a width and a length each in order of a few centimeters. An antenna may be in the form of, for example, a dipole or a half dipole. An antenna may be similar to the antenna described in European patent application No. 07120529.8. This patent application describes an antenna module AM that is suitable for use in a directional distance measurement arrangement DDM as illustrated in FIG. 1.

Figure 3:
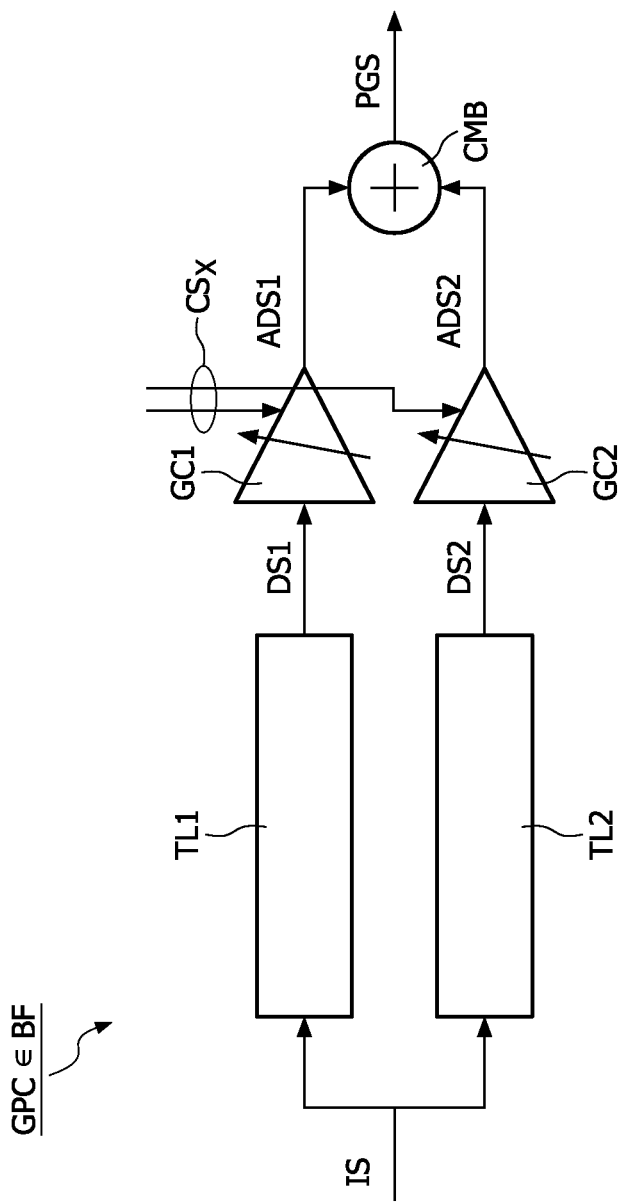
FIG. 3 is a circuit diagram that illustrates a gain/phase adjustment circuit, which may form part of the directional distance measurement arrangement.

FIG. 3 illustrates a gain/phase adjustment circuit GPC that can be used to advantage in the beam-forming module BF illustrated in FIG. 1. The aforementioned respective transmission signal paths, which extend from the transmission input TI to the respective antenna ports $AP_1, AP_2, AP_3, \ldots, AP_N$, may each comprise a gain/phase adjustment circuit GPC as illustrated in FIG. 3. Similarly, the aforementioned respective reception signal paths that extend from the respective antenna ports $AP_1, AP_2, AP_3, \ldots, AP_N$ to the reception output RO may also each comprise a gain/phase adjustment circuit GPC as illustrated in FIG. 3. The gain/phase adjustment circuit GPC illustrated in FIG. 3 allows a relatively precise phase shift with relatively modest signal losses only.

The gain/phase adjustment circuit GPC comprises two transmission lines TL1, TL2, two gain-controllable circuits GC1, GC2, and a signal combiner CMB. The two transmission lines TL1, TL2 have different lengths. The two transmission lines TL1, TL2 may be implemented on, for example, the same substrate on which the antenna module AM is formed. The two gain-controllable circuits GC1, GC2 may comprise, for example, amplifiers including one or more transistors. The two gain-controllable circuits GC1, GC2 may equally be in the form of, for example, attenuators that comprise one or more passive components. The signal combiner CMB may be, for example, an adder or a subtractor. The signal combiner CMB may be in the form of, for example, a node in case the signals that are to be added, or to be subtracted, are in the form of currents.

The gain/phase adjustment circuit GPC basically operates as follows. The gain/phase adjustment circuit GPC receives an input signal IS that is applied to each of the two transmission lines TL1, TL2. The two transmission lines TL1, TL2 provide different signal delays due to their different lengths. Accordingly, transmission line TL1 provides a first delayed signal DS1 that has a given delay with respect to the input signal IS. Transmission line TL2 provides a second delayed signal DS2 that has another given delay with respect to the input signal IS. Accordingly, the first delayed signal DS1 and the second delayed signal DS2 are phase shifted with respect to each other, and with respect to the input signal IS.

Gain-controllable circuit GC1 receives the first delayed signal DS1. Gain-controllable circuit GC2 receives the second delayed signal DS2. These respective gain-controllable circuits GC1, GC2 and provide respective gains, which depend on a gain/phase control signal $CS_X$. More specifically, the gain/phase control signal $CS_X$ defines a gain ratio. Accordingly, gain-controllable circuit GC1 provides a first delayed gain-adjusted signal ADS1 and gain-controllable circuit GC2 provides a second delayed gain-adjusted signal ADS2, which have a given magnitude relationship with respect to each other that is defined by the gain/phase control signal $CS_X$. Moreover, the aforementioned delayed gain-adjusted signals ADS1, ADS2 have a particular phase shift with respect to each other, which is defined by a difference in length of the two transmission lines TL1, TL2. The signal combiner CMB combines the first delayed gain-adjusted signal ADS1 and the second delayed gain-adjusted signal ADS2 into a gain/phase-controlled output signal PGS.

The gain/phase-controlled output signal PGS has a given magnitude and phase relationship with respect to the input signal IS. This magnitude and phase relationship can be adjusted by varying the respective gains of the two gain-controllable circuits GC1, GC2. More specifically, the gain/phase-controlled output signal PGS has a phase shift with respect to the input signal IS that can be adjusted by adjusting the gain ratio of the two gain-controllable circuits GC1, GC2.

For example, let it be assumed that the gain of gain-controllable circuit GC2 is insignificant with respect to that of gain-controllable circuit GC1. In that case, the phase shift is substantially equal to that introduced by transmission line TL1 plus a phase shift that gain-controllable circuit GC1 may introduce. Conversely, let it now be assumed that the gain of gain-controllable circuit GC1 is insignificant with respect to that of gain-controllable circuit GC2. In that case, the phase shift of the gain/phase-controlled output signal PGS is substantially equal to that introduced by transmission line TL2 plus a phase shift that gain-controllable circuit GC2 may introduce. In case the phase shift introduced by each of the two gain-controllable circuits GC1, GC2 may be ignored, the phase shift of the gain/phase-controlled output signal PGS can be varied between the phase shift introduced by transmission line TL1 and the phase shift introduced by transmission line TL2.

Figure 4:
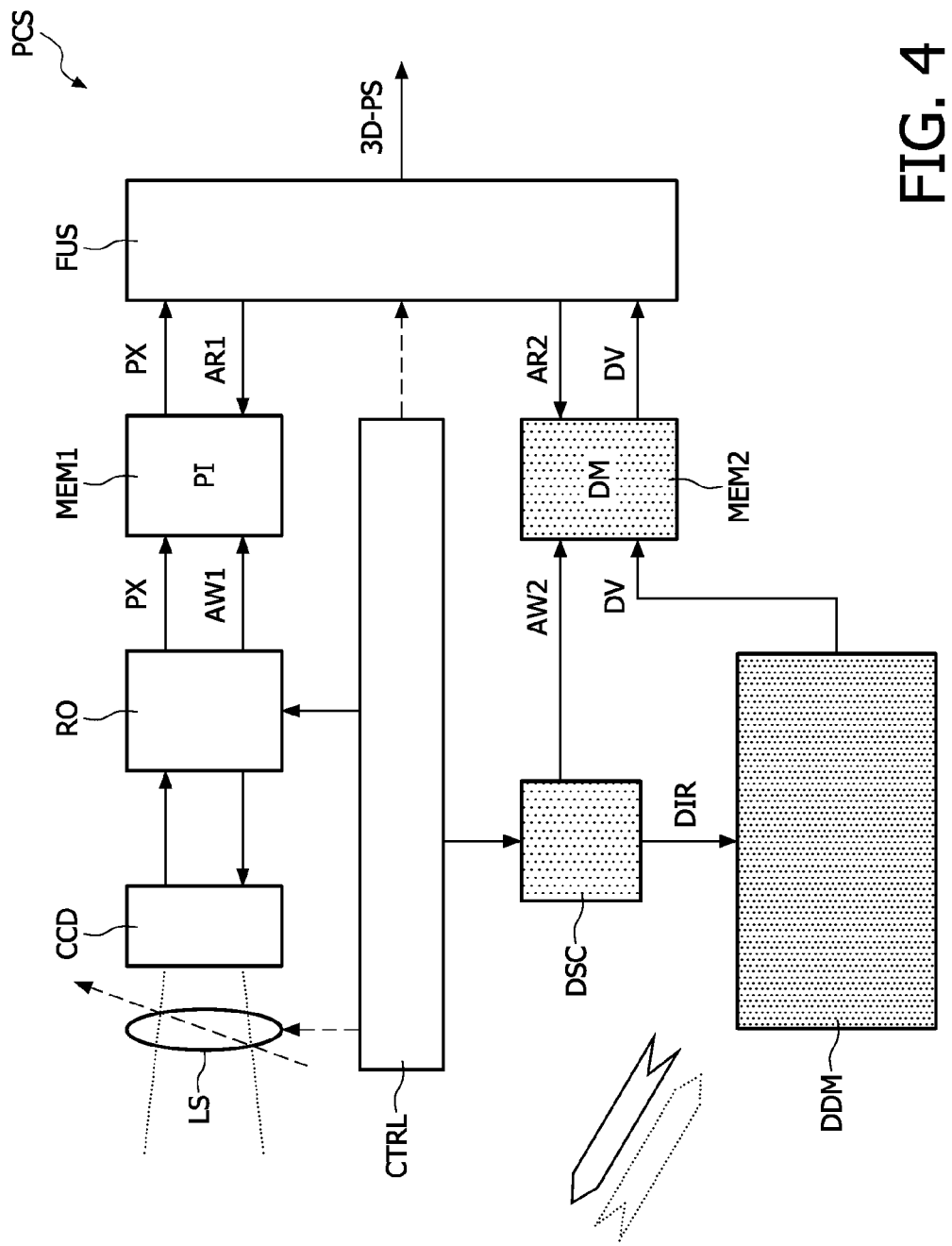
FIG. 4 is a block diagram that illustrates a 3-D picture capturing system that includes the directional distance measurement arrangement illustrated in FIG. 1.

FIG. 4 illustrates a 3-D picture capturing system PCS, in which the directional distance measurement arrangement DDM illustrated in FIG. 1 is applied. The 3-D picture capturing system PCS comprises various functional entities that form a 2-D picture capturing path: a lens LS, a camera sensor CCD, a readout module RO, and a first memory MEM1. The 3-D picture capturing system PCS further comprises the following functional entities: a controller CTRL, a depth scan controller DSC, a second memory MEM2, and a fusion module FUS.

The camera sensor CCD may be, for example, of the charge coupled device type. The camera sensor CCD will typically comprise a matrix of optoelectronic transducer cells, each corresponding with a pixel. The camera sensor CCD may be implemented on the substrate SUB jointly with the antenna module AM illustrated in FIG. 1. This will be described in greater detail hereinafter.

The readout module RO will typically be a circuit dedicated to the camera sensor CCD and may comprise, for example, one or more analog to digital converters. The first and the second memory MEM1, MEM2 may form part of, for example, a single memory circuit, or may each constitute a separate memory circuit.

The controller CTRL may be in form of, for example, an instruction execution device and a program memory that comprises a set of instructions, which defines operations that the controller CTRL carries out. The depth scan controller DSC and the fusion module FUS may be implemented in a similar form. What is more, the controller CTRL, the depth scan controller DSC, and the fusion module FUS may share the same instruction execution device, which carries out respective operations belonging to respective functional entities.

The 3-D picture capturing system PCS basically operates as follows. The controller CTRL triggers the readout module RO to form a picture PI. In order to do so, the readout module RO successively reads respective signals provided by respective optoelectronic transducer cells. These respective signals are processed, which may involve analog to digital conversion, so as to form respective pixels PX for the picture. The readout module RO writes these respective pixels PX into respective memory locations of the first memory MEM1. The readout module RO designates a particular memory location by means of a write address AW1. Accordingly, the readout module RO forms the picture PI in the memory on, for example, a pixel by pixel basis. A pixel PX, which corresponds with a particular optoelectronic transducer cell, has a particular address.

The controller CTRL further triggers the depth scan controller DSC to successively apply respective direction commands DIR to the directional distance measurement arrangement DDM. The directional distance measurement arrangement DDM provides respective distance values DV in response to the respective direction commands DIR, in a manner as described hereinbefore with reference to FIG. 1. The controller CTRL preferably triggers the depth scan controller DSC so that the respective distance values DV are provided while the picture PI is formed, or shortly before, or shortly thereafter. The depth scan controller DSC writes the respective distance values DV into respective memory locations of the second memory MEM2. The depth scan controller DSC designates a particular memory by means of a write address AW2. Accordingly, the depth scan controller DSC forms a collection of distance values in the second memory MEM2. A distance value DV has a particular address and relates to a particular direction seen from the 3-D picture capturing system PCS.

Preferably, respective distance values DV, which are present in the second memory MEM2, can directly be associated with respective pixels PX of the picture, which are present in the first memory MEM1. To that end, the depth scan controller DSC preferably comprises data that defines a link between a particular pixel in the picture, or a particular group of pixels, and a direction in which a distance should be measured. This data may be in the form of, for example, one or more tables. Alternatively, a relationship between pixel position and direction may be defined by means of an equation that comprises one or more parameters, which can be adjusted.

Let it be assumed, for example, that the lens LS is fixed. In that case, a single table may be sufficient for associating respective distance values DV with respective pixels PX. The lens LS and the camera sensor CCD have given, fixed optical characteristics so that a particular direction can uniquely be defined for a particular pixel in the picture. A table comprising a column "pixel position" and a column "direction" may define the same. The pixel position may be expressed as a write address AW2 for the second memory MEM2. The direction may be expressed as an appropriate direction command DIR, which can be applied to the directional measurement system.

In case the lens LS can be adjusted, which means that various lens settings are possible, the relationship between pixel position and direction depends on the lens setting. In that case, the depth scan controller DSC may comprise respective tables for respective lens settings, each table specifying a particular direction for a particular pixel position. Since these lens settings will typically be adjusted by means of the controller CTRL, the controller CTRL will have knowledge, as it were, of the lens setting. The controller CTRL may communicate the lens setting to the depth scan controller DSC so that the depth scan controller DSC may select the appropriate table. Alternatively, in case the relationship between pixel position and direction is defined by means of an equation, the depth scan controller DSC can account for different lens settings by adjusting one or more parameters of this equation on the basis of information pertaining to the lens setting from the controller CTRL.

The fusion module FUS provides a 3-D picture by effectively adding a depth map DM to the picture PI, which is stored in the first memory MEM1. The depth map DM may correspond with the collection of distance values, which are stored in the second memory MEM2. This is the case when respective distance values DV, which are present in the second memory MEM2, can directly be associated with respective pixels PX, which are present in the first memory MEM1, as mentioned hereinbefore. In case in respective distance values DV cannot directly be associated with respective pixels PX, the fusion module FUS may create a depth map DM by means of interpolation or extrapolation, or both, between distance values DV that are present in the second memory MEM2. Such interpolations and extrapolations can be regarded as functionally equivalent to the tables mentioned hereinbefore.

Figure 5:
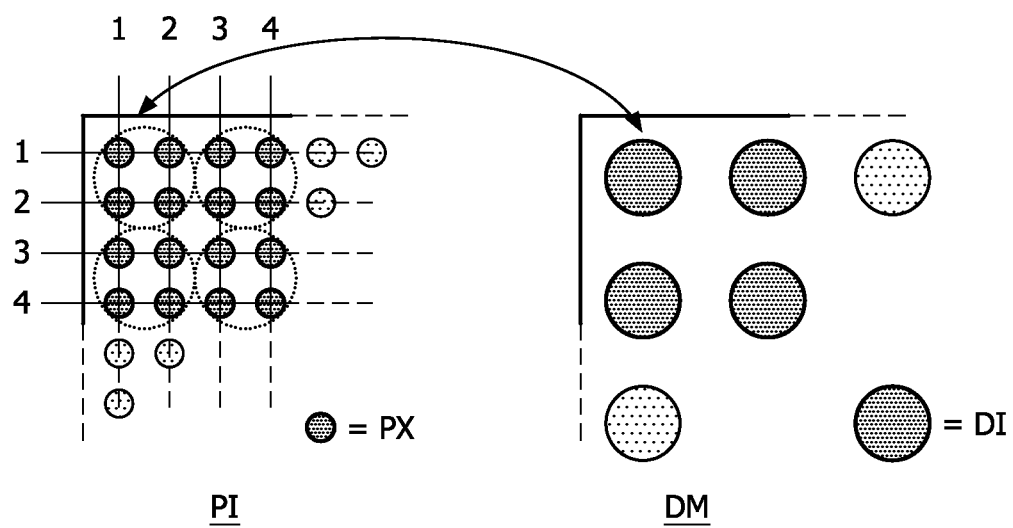
FIG. 5 is a conceptual diagram that illustrates a picture and a depth map associated therewith, which are generated within the 3-D picture capturing system.

FIG. 5 illustrates a portion of a picture PI and a corresponding portion of a depth map DM associated with the picture PI, which jointly constitute a 3-D picture. The picture comprises various pixels PX, which are represented by means of relatively small circles with a dark-grayish filling. The pixels PX are organized in lines and in columns, which are numbered in FIG. 5. That is, a pixel has a unique combination of a line number and a column number that defines the pixel position. The depth map DM comprises various depth indication values DI, which are represented by means of relatively large circles with a light-grayish filling. For example, FIG. 5 illustrates that the depth map DM has an upper left depth indication value DI that is associated with an upper left block of four pixels in the picture, namely pixels having positions (1,1); (1,2); (2,1); (2,2) whereby these positions are expressed in terms of line number and column number separated by a comma.

FIG. 5 illustrates that a depth indication value applies DI to a cluster of four pixels PX. That is, four neighboring pixels share the same depth indication value. Accordingly, the depth map DM illustrated in FIG. 5 has a resolution that is four times lower than that of the picture; the resolution is two times lower in a vertical direction and two times lower in a horizontal direction. This is merely an example; the resolution of the depth map DM may also be, for example, 16 times lower than that of the picture. An advantage of the depth map DM having a lower resolution than that of the picture is that fewer directions have to be scanned, as it were, in order to measure a distance. That is, the lower the resolution of the depth map DM is, the fewer were the number of distance values DV that the directional distance measurement arrangement DDM has to generate per unit of time. This relaxes requirements on the directional distance measurement arrangement DDM.

It is possible to effectively increase the resolution of a depth map by making use of information that is contained in the picture. The international patent application published under number WO 2007/132397 describes such a technique. For example, let it be assumed that the picture comprises an object that has a given outline, which is marked by a change in luminance values or in chrominance values, or both. It is thus possible to identify this outline in the picture and to map, as it were, this outline to a higher resolution depth map. A change in depth indication value should, as a general rule, correspond with a change in luminance values or in chrominance values, or both.

A depth indication value DI of the depth map DM illustrated in FIG. 5 may correspond with a distance value DV, which is provided by the directional distance measurement arrangement DDM. That is, a depth indication value may directly express a distance between a virtual observer, which corresponds with the 3-D picture capturing system PCS, and an object that is at least partially represented by the pixels to which the depth indication value applies. Alternatively, a depth indication value may be expressed in terms of parallax. A distance value can be converted into a parallax value, and vice versa, by means of a predefined equation that comprises various parameters, including screen width and typical viewing distance. For example, the fusion module FUS illustrated in FIG. 4 may implement this equation so as to obtain a depth map that comprises parallax values.

Let it be assumed that the depth map DM corresponds with the collection of distance values DV, which are stored in the second memory MEM2, as mentioned hereinbefore and illustrated in FIG. 4. In that case, the fusion module FUS may read a pixel PX, or a group of pixels, from the first memory MEM1 in which the picture PI is stored. To that end, the fusion module FUS applies one or more read addresses AR1 to the first memory MEM1, which correspond with the position of the pixel PX, or the respective positions of the pixels in the group concerned.

Subsequently, the fusion module FUS may read a distance value DV from the second memory MEM2 that applies to the aforementioned pixel PX, or the aforementioned group of pixels, whichever applies. To that end, the fusion module FUS applies a read address AR2 to the second memory MEM2 under which the distance value DV is stored. This latter read address AR2 is associated with the aforementioned one or more read addresses AR1 under which the one or more pixels concerned are stored. This association can be relatively simple. For example, the respective pixel positions illustrated in FIG. 5 can be regarded as respective read addresses AR1 that the fusion module FUS applies to the first memory MEM1. Respective depth indication values DI have respective positions within the depth map DM, which can be regarded as respective read addresses AR2 that the fusion module FUS applies to the second memory MEM2.

Figure 6:
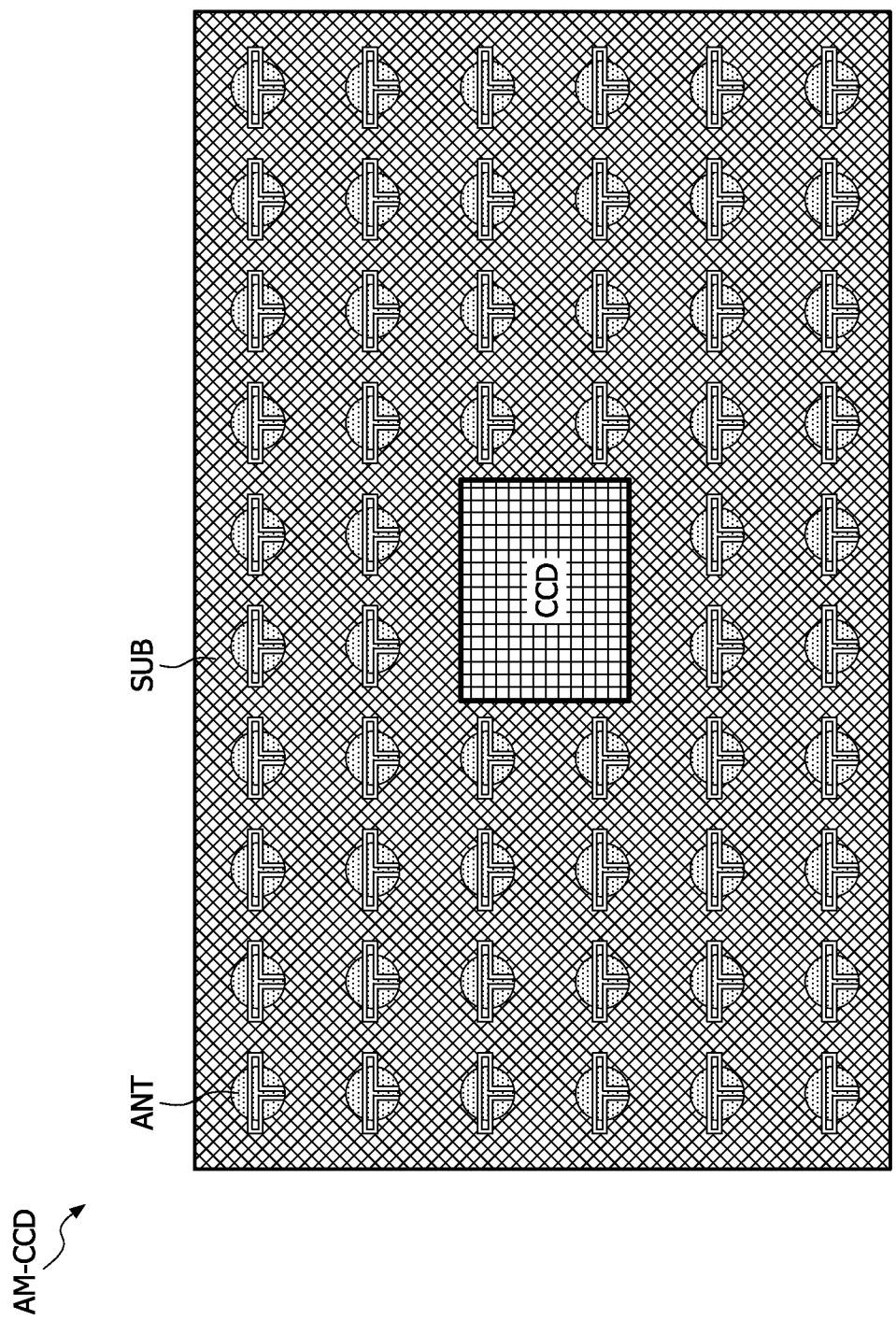
FIG. 6 is a pictorial diagram that illustrates an antenna and camera sensor module, which may be applied to advantage in the 3-D picture capturing system.

FIG. 6 illustrates an antenna and camera sensor module AM-CCD, which may advantageously replace the antenna module AM illustrated in FIGS. 1 and 2, when the directional distance measurement arrangement DDM is applied in a 3-D picture capturing system PCS as illustrated in FIG. 4. The antenna and camera sensor module AM-CCD may be similar to the antenna module AM illustrated in FIG. 2, except that four antennas, which are located at the center, are replaced by a camera sensor CCD. This camera sensor may be the camera sensor CCD illustrated in FIG. 4. The antenna and camera sensor module AM-CCD thus comprises a substrate SUB, which may be similar to that of the antenna module AM illustrated in FIG. 2, discussed hereinbefore. The substrate SUB is provided with the camera sensor CCD and a plurality of antennas ANT that surround the camera sensor CCD. A Webcam that is capable of producing 3-D pictures may be realized by means of the antenna and camera sensor module AM-CCD illustrated in FIG. 6. Such a 3-D Webcam can be relatively inexpensive, in particular because antennas ANT for directional distance measurement can be integrated with a camera sensor CCD on a single substrate.

CONCLUDING REMARKS

The detailed description hereinbefore with reference to the drawings is merely an illustration of the invention and the additional features, which are defined in the claims. The invention can be implemented in numerous different ways. In order to illustrate this, some alternatives are briefly indicated.

The invention may be applied to advantage in numerous types of products or methods related to distance measurements, in particular for generating a three-dimensional representation of a scene. This three-dimensional representation may be in the form of, for example, a video or a still picture, that is, a 3-D video or a 3-D photo.

There are numerous ways of implementing a distance measurement arrangement in accordance with the invention. For example, two different sets of antennas may be provided: one set specifically intended for transmission, the other set being specifically intended for reception. Different directional antenna patterns may be used for transmission and reception. For example, a relatively wide beam may be transmitted that illuminates, as it were, an entire scene of interest. Directional distance measurements may then be obtained by providing different directional antenna patterns with maxima in different directions for reception only. Measurements may include directional velocity measurements based on Doppler shift effects. A substrate on which antennas are provided may have a curved shape so as to allow distance measurements in a relatively great variety of directions. Such a substrate may be in the form of, for example, a flexible foil, which is bendable.

A distance measurement arrangement in accordance with the invention need not operate in a time-multiplex fashion. For example, referring to FIG. 1, the distance determination module DD may be adapted so that a frequency modulated continuous wave is applied to beam-forming module BF. To that end, the distance determination module DD may comprise a frequency-controllable oscillator, which receives a sweep signal as a frequency control signal. This sweep signal may be, for example, triangle-shaped or sawtooth-shaped. The distance measurement arrangement DDS may further be provided with a circulator, which effectively separates transmission signals and reception signals. Accordingly, distance measurements can be carried out while simultaneously transmitting signals and receiving signals, which are reflections. A transmission mode and a reception mode may simultaneously occur; a transmission step and a reception step may simultaneously be carried out.

There are numerous ways of defining respective magnitude and phase relationships with respect to respective antennas. FIG. 3 illustrates an example to which there are many alternatives. For example, a so-called quadrature oscillator may be used that provides a pair of signals, which are mutually phase shifted by 90°. A desired phase may be defined by combining these signals using appropriate weighting factors. As another example, so-called poly-phase filters may be used that in order to obtain a pair of signals, which are mutually phase shifted by 90° and which may be combined with proper weighting factors. The respective magnitude and phase relationships may also be defined in a digital domain, that is, by means of digital circuits. A carrier wave may be generated and processed in the digital domain and converted into an analog signal, which is directly applied to an antenna in a transmission mode.

The term "picture" should be understood in a broad sense. The term includes any entity that allows visual rendering, such as, for example, image, frame, or field.

In broad terms, there are numerous ways of implementing functional entities by means of hardware or software, or a combination of both. In this respect, the drawings are very diagrammatic. Although a drawing shows different functional entities as different blocks, this by no means excludes implementations in which a single entity carries out several functions, or in which several entities carry out a single function. For example, referring to FIG. 4, the readout module RO, the controller CTRL, the depth scan controller DSC, the first memory MEM1, the second memory MEM2, and the fusion module FUS, as well as elements of the directional distance measurement arrangement DDM, may jointly be implemented by means of a suitably programmed processor or a dedicated processor in the form of an integrated circuit that comprises all these functional entities.

There are numerous ways of storing and distributing a set of instructions, that is, software, which allows a programmable circuit to operate in accordance with the invention. For example, software may be stored in a suitable medium, such as an optical disk or a memory circuit. A medium in which software stored may be supplied as an individual product or together with another product, which may execute software. Such a medium may also be part of a product that enables software to be executed. Software may also be distributed via communication networks, which may be wired, wireless, or hybrid. For example, software may be distributed via the Internet. Software may be made available for download by means of a server. Downloading may be subject to a payment.

The remarks made herein before demonstrate that the detailed description with reference to the drawings, illustrate rather than limit the invention. There are numerous alternatives, which fall within the scope of the appended claims. Any reference sign in a claim should not be construed as limiting the claim. The word "comprising" does not exclude the presence of other elements or steps than those listed in a claim. The word "a" or "an" preceding an element or step does not exclude the presence of a plurality of such elements or steps. The mere fact that respective dependent claims define respective additional features, does not exclude a combination of additional features, which corresponds to a combination of dependent claims.

The invention claimed is:

1. A distance measurement arrangement that provides a distance indication based on a delay between an electromagnetic signal which is transmitted in a transmission mode, and a reflection of the electromagnetic signal which is received in a reception mode, the distance measurement arrangement comprising:
   an antenna module comprising a plurality of antennas for transmitting the electromagnetic signal and for receiving the reflection;
   a beam-forming module for defining respective magnitude and phase relationships with respect to respective antennas in the antenna module so as to cause the antenna module to provide a directional antenna pattern in at least one of the two transmission mode and the reception mode; and
   a beam-forming and steering control module for controlling the respective magnitude and phase relationships as a function of a direction command,
   wherein the beam-forming module comprises a gain/phase adjustment circuit, the gain/phase adjustment circuit comprising:
   a pair of transmission lines of different length for providing a first delayed signal and a second delayed signal in response to an input signal;
   a pair of gain-controllable circuits for providing a first gain-adjusted delayed signal and a second gain-adjust delayed signal in response to the first delayed signal and the second delayed signal, respectively; and
   a signal combiner for combining the first gain adjusted delayed signal and the second gain-adjusted delayed signal,
   wherein the beam-forming and steering control module is configured to control a ratio between the first gain adjusted delayed signal and the second gain-adjusted delayed signal.

2. The distance measurement arrangement according to claim 1, wherein the antenna module comprises a substrate on which the plurality of antennas is provided.

3. The distance measurement arrangement according to claim 2, wherein the substrate comprises printed circuit board material.

4. The distance measurement arrangement according to claim 1, further comprising a distance detection module configured to generate a carrier wave in a wavelength range between 1 cm and 1 mm, the carrier wave forming part of the electromagnetic signal that is transmitted.

5. A three-dimensional (3-D) picture capturing system comprising the distance measurement arrangement according to claim 1, and further comprising:
   a picture capturing arrangement for capturing a two-dimensional picture; and
   a depth map generation module for applying respective direction commands to the distance measurement arrangement so as to obtain respective distance indications for respective portions in the two-dimensional picture.

6. The 3-D picture capturing system according to claim 5, wherein the respective portions of the two-dimensional picture for which the respective distance indications are obtained comprise several pixels.

7. The 3-D picture capturing system according to claim 5, wherein the depth map generation module is configured to provide different respective direction commands for different lens settings in the picture capturing arrangement.

8. The 3-D picture capturing system according to claim 5, further comprising a substrate on which the plurality of antennas of the antenna module is provided and on which a camera sensor of the picture capturing arrangement is provided.

9. A method of distance measurement comprising the acts of:
   transmitting an electromagnetic signal;
   receiving a reflection of the electromagnetic signal;
   providing a distance indication based on a delay between the electromagnetic signal which is transmitted in the transmitting act, and the reflection of the electromagnetic signal which is received in the receiving;
   beam-forming by beam-forming module comprises to define respective magnitude and phase relationships with respect to respective antennas in an antenna module so as to cause the antenna module to provide a directional antenna pattern in at least one of the transmitting act and the receiving act; and
   controlling by a beam-forming and steering control module the respective magnitude and phase relationships as a function of a direction command,
   wherein the beam-forming module comprises a gain/phase adjustment circuit, the gain/phase adjustment circuit comprising:
   a pair of transmission lines of different length for providing a first delayed signal and a second delayed signal in response to an input signal;
   a pair of gain-controllable circuits for providing a first gain-adjusted delayed signal and a second gain-adjust delayed signal in response to the first delayed signal and the second delayed signal, respectively; and a signal combiner for combining the first gain adjusted delayed signal and the second gain-adjusted delayed signal, wherein the beam-forming and steering control module is configured to control a ratio between the first gain adjusted delayed signal and the second gain-adjusted delayed signal.

10. A method of three-dimensional picture capturing comprising the acts of:

capturing a two-dimensional picture; and generation a depth map by carrying out the method of claim 9 multiple times for respective direction commands so as to obtain respective distance indications for respective portions in the two-dimensional picture.

11. A non-transitory computer readable medium comprising computer instructions, which when executed by a processor, configure the processor to perform the act of:

transmitting an electromagnetic signal;

receiving a reflection of the electromagnetic signal;

providing a distance indication based on a delay between the electromagnetic signal which is transmitted in the transmitting act, and the reflection of the electromagnetic signal which is received in the receiving;

beam-forming by beam-forming module comprises to define respective magnitude and phase relationships with respect to respective antennas in an antenna module so as to cause the antenna module to provide a directional antenna pattern in at least one of the transmitting act and the receiving act; and controlling by a beam-forming and steering control module the respective magnitude and phase relationships as a function of a direction command, wherein the beam-forming module comprises a gain/phase adjustment circuit, the gain/phase adjustment circuit comprising:

a pair of transmission lines of different length for providing a first delayed signal and a second delayed signal in response to an input signal;

a pair of gain-controllable circuits for providing a first gain-adjusted delayed signal and a second gain-adjust delayed signal in response to the first delayed signal and the second delayed signal, respectively; and a signal combiner for combining the first gain-adjusted delayed signal and the second gain-adjusted delayed signal, wherein the beam-forming and steering control module is configured to control a ratio between the first gain adjusted delayed signal and the second gain-adjusted delayed signal.

* * * * *